United States Patent
Henry

(10) Patent No.: US 12,030,142 B2
(45) Date of Patent: Jul. 9, 2024

(54) METHOD AND APPARATUS FOR PROVIDING WELDING POWER

(71) Applicant: Illinois Tool Works Inc., Glenview, IL (US)

(72) Inventor: Andrew Joseph Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 178 days.

(21) Appl. No.: 17/494,368

(22) Filed: Oct. 5, 2021

(65) Prior Publication Data

US 2022/0023964 A1 Jan. 27, 2022

Related U.S. Application Data

(62) Division of application No. 16/264,080, filed on Jan. 31, 2019, now Pat. No. 11,148,219, which is a division of application No. 13/843,926, filed on Mar. 15, 2013, now Pat. No. 10,207,351.

(51) Int. Cl.
*B23K 9/10* (2006.01)

(52) U.S. Cl.
CPC .................. *B23K 9/1043* (2013.01)

(58) Field of Classification Search
CPC .... B23K 9/095; B23K 9/1043; B23K 9/1006; B23K 9/1012; B23K 9/10; B23K 9/00; H02M 1/34; H02M 1/4225; H02M 3/156; H02M 1/007

See application file for complete search history.

(56) References Cited

U.S. PATENT DOCUMENTS

| | | | |
|---|---|---|---|
| 5,444,356 A * | 8/1995 | Reynolds | B23K 9/1043 363/101 |
| 6,115,273 A | 9/2000 | Geissler | |
| 6,801,443 B2 | 10/2004 | Manthe | |
| 6,987,242 B2 | 1/2006 | Geissler | |

(Continued)

FOREIGN PATENT DOCUMENTS

| | | |
|---|---|---|
| CN | 1978114 | 6/2007 |
| CN | 101214575 | 3/2008 |
| JP | H1076364 | 7/1998 |

OTHER PUBLICATIONS

International Search Report and Written Opinion, dated Sep. 10, 2014, European Patent Office, Rijswijk, Netherlands.

(Continued)

*Primary Examiner* — Brian W Jennison
(74) *Attorney, Agent, or Firm* — George R. Corrigan

(57) ABSTRACT

A method and apparatus for providing welding type power is disclosed. A welding type power supply includes an input circuit, a controller and an output circuit. The input circuit receives an input power signal and provides an intermediate power signal. The output circuit receives the intermediate power signal and provides a welding type power output. The output circuit has an inverter with at least two inverter switches, and a clamp circuit that limits the voltage across the inverter. The clamp circuit captures and buffers the excess energy, and returns the excess energy to an input of the inverter over a plurality of switching cycles. The controller has control outputs connected to the input circuit and the output circuit, to control them.

5 Claims, 4 Drawing Sheets

(56) References Cited

U.S. PATENT DOCUMENTS

| | | |
|---|---|---|
| 8,829,869 B2 | 9/2014 | Kooken |
| 9,705,411 B2 | 7/2017 | Jang |
| 11,148,219 B2 | 10/2021 | Henry |
| 2005/0279742 A1 | 12/2005 | Stava |
| 2008/0223840 A1 | 9/2008 | Era |
| 2009/0039063 A1 | 2/2009 | Madsen |
| 2009/0230941 A1* | 9/2009 | Vogel ............... B23K 9/1043 323/305 |
| 2010/0320182 A1* | 12/2010 | Madsen ............. B23K 9/095 219/130.51 |
| 2011/0278273 A1 | 11/2011 | Hirota |
| 2011/0309054 A1 | 12/2011 | Salsich |
| 2014/0083987 A1 | 3/2014 | Dodge |
| 2014/0203006 A1* | 7/2014 | Koprivnak ......... B23K 9/0738 219/130.4 |

OTHER PUBLICATIONS

First Chinese Office Action, dated Jun. 20, 2016, State Intellectual Property Office of the P.R.C (SIPO), 100088 Beijing, China.

* cited by examiner

US 12,030,142 B2

METHOD AND APPARATUS FOR PROVIDING WELDING POWER

RELATED APPLICATIONS

This is a divisional of, and claims the benefit of the tiling date of, U.S. patent application Ser. No. 16/264,080, filed on Jan. 31, 2019 which is a divisional of, and claims the benefit of the filing date of, U.S. patent application Ser. No. 13/843,926, filed on Mar. 15, 2013, which issued on Feb. 19, 2019 as U.S. patent Ser. No. 10/207,351.

FIELD OF THE INVENTION

The present disclosure relates generally to the art of providing welding type power. More specifically, it relates to providing welding type power using an inverter based output circuit.

BACKGROUND OF THE INVENTION

There are many known types of welding-type power supplies that provide welding type power. Welding type power, as used herein, refers to power suitable for electric arc welding, plasma arc cutting or induction heating. Welding-type power supply, as used herein, refers to a power supply that can provide welding type power. Welding type systems are used to perform a variety of processes and used in a variety of settings. Welding-type system, as used herein, is a system that can provide welding type power, and can include control and power circuitry, wire feeders, and ancillary equipment.

Some welding type systems include a preregulator which provides a dc bus, followed by an inverter based output circuit. The preregulator conditions the input power, and provides a known dc bus. The inverter based output circuit receives the bus and provides the welding type power as an output. One successful design includes a boost circuit as part of the preregulator, and the output circuit includes an inverter, transformer, rectifier and output inductor. This type of welding type power supply is described in U.S. Pat. No. 6,987,242 (Geissler). Other welding type power supplies that have inverter based output circuits include U.S. Pat. No. 6,115,273 (Geissler) and Patent Publication 20090230941 (Vogel), all three of which are owned by the owner of this patent, and all three of which are hereby incorporated by reference. Other welding type power supplies include additional stages, or use other topologies for each stage (such as a buck preregulator, a combined rectifier-boost preregulator, a chopper instead of or following the inverter, a second inverter following the first inverter, etc.

Inverter based output circuits offer many advantages, but they do have some drawbacks. First, the switches and diodes used in an inverter circuit can fail, particularly when exposed to higher than rated voltages. Clamping voltages is known, but can result in excess losses. Also, commutating switches and diodes can create excess heat. U.S. Pat. No. 6,801,443 returned the entire clamp energy back into the output in one single switching event.

Most welding type power supplies include and output inductor. Starting the welding process can be difficult, particularly with a large output inductor, because the inductor must be "charged" before welding can be preformed. This can be made more difficult during starting because of the higher than usual arc voltage. Past welding type power supplies have started by a "crowbar" of the bus but that can stress components.

Accordingly, a welding type power supply with an inverter output circuit that is clamped in an efficient manner is desirable. Preferably, such welding type power supply would also provide for efficient commutations of devices and will provide for efficient starting of the weld process.

SUMMARY OF THE PRESENT INVENTION

According to a first aspect of the disclosure a welding type power supply includes an input circuit, a controller and an output circuit. The input circuit receives an input power signal and provides an intermediate power signal. The output circuit receives the intermediate power signal and provides a welding type power output. The output circuit has an inverter with at least two inverter switches, and a clamp circuit that limits the voltage across the inverter. The clamp circuit captures and buffers the excess energy, and returns the excess energy to an input of the inverter over a plurality of switching cycles. The controller has control outputs connected to the input circuit and the output circuit, to control them.

According to a second aspect of the disclosure a method of providing welding power includes receiving input power and providing an intermediate power signal. The intermediate power signal is inverted by controlling at least two inverter switches to provide an inverter output. The voltage across the inverter is clamped and the excess energy is captured and buffered provided to an input of the inverter over a plurality of switching cycles.

The clamp circuit includes a buck circuit in one embodiment.

The output circuit includes an intermediate inverter, a transformer and a rectifier in another embodiment. The intermediate inverter receives the intermediate power signal and provides an intermediate ac signal to the transformer. The transformer provides a transformed ac signal to the rectifier. The rectifier provides a rectified dc signal to the inverter.

The rectifier includes at least two diodes and a second clamp circuit limits the voltage across the at least two diodes, and provides an output across the voltage source in another embodiment.

The clamp circuit includes a voltage source connected to the buck circuit in one alternative.

The inverter is a half bridge inverter with two inverter switches or a is a full bridge inverter with four inverter switches in other alternatives.

The buck circuit has a buck switch, and feedback indicative of the voltage across the clamp is provided to the controller so that the controller controls the buck switch in response to the voltage across the inverter in yet another embodiment.

According to a third aspect of the disclosure a welding type power supply includes an input circuit, an intermediate inverter, a transformer, a rectifier an output inductor and a controller. The input circuit receives an input power signal and provide an intermediate power signal. The intermediate inverter receives the intermediate power signal and provides an intermediate ac signal. The transformer receives the intermediate ac signal and provides a transformed ac signal. The rectifier receives the intermediate ac signal and provides a rectified dc signal to the inductor. The rectifier includes at least two diodes and a clamp circuit that limits the voltage across diodes and captures the excess energy. The controller controls the input circuit and the intermediate inverter.

According to a fourth aspect of the disclosure a welding type power supply includes an input circuit, an output circuit, and a controller. The output circuit receives the intermediate signal and provides a welding-type signal. The output circuit includes an output inductor and an inverter. The inverter has at least two inverter switches. The inverter includes a clamp circuit having a voltage source and the clamp circuit is connected to charge the inductor. The controller controls the input circuit and the output circuit.

The clamp circuit limits the voltage across the inverter, and includes a buck circuit that can be used to assist in arc striking and stabilizing The output circuit includes a transformer and a rectifier having at least two diodes, and a second clamp circuit limits the voltage across the at least two diodes and provides an output across the voltage source in another embodiment.

The input circuit includes a boost circuit, and the intermediate power signal is a boosted dc bus in another embodiment.

Other principal features and advantages will become apparent to those skilled in the art upon review of the following drawings, the detailed description and the appended claims.

Figure 1:
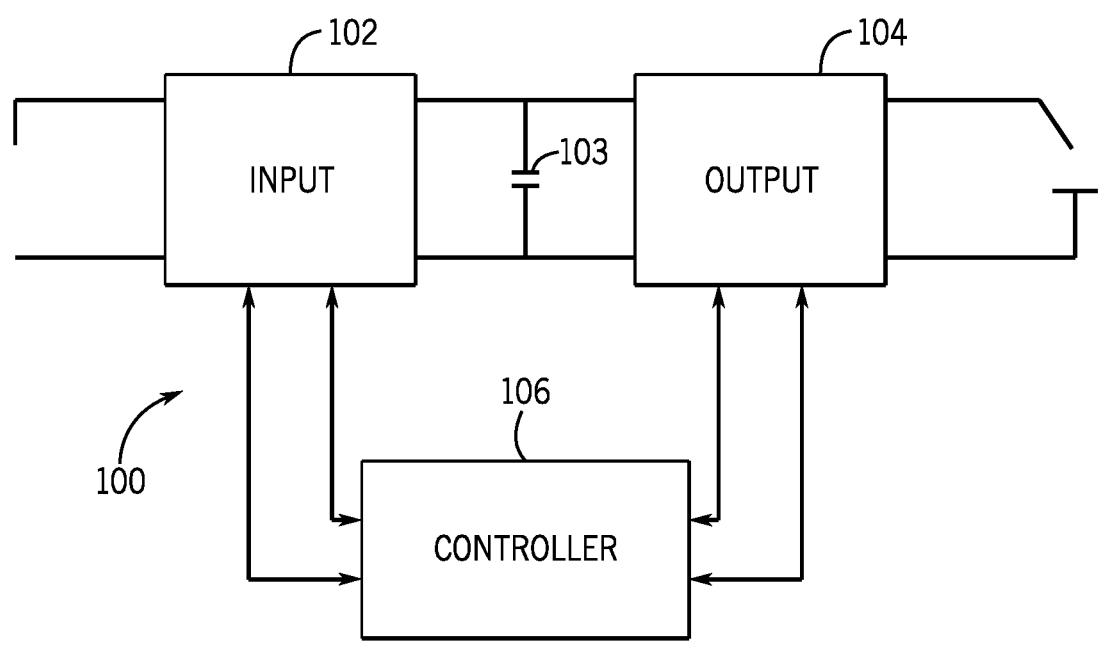
FIG. 1 is a diagram of a welding-type system in accordance with the preferred embodiment.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular circuit and a particular system, it should be understood at the outset that other circuits and systems may be used.

Generally, the preferred embodiment is implemented with a welding-type system such as that shown in U.S. Pat. No. 6,987,242. It includes a preregulator input circuit that creates an intermediate power signal (preferably a dc bus), an output circuit with an inverter, a transformer, and a rectifier and a controller. Additionally, an output inverter is provided in the preferred embodiment, for ac welding. The output inverter receives the transformed and rectified signal, and provides an ac welding signal. An output inductor is provided, preferably after the inverter. Alternatives provide for the inductor being before the output inverter, omitting the output inverter, using a chopper, using a buck preregulator, using a combined boost-rectifier preregulator, omitting the boost (and inverting the rectified input).

Input circuit, as used herein, includes the circuitry that receives input power such as rectifiers, filters, preregulators, etc. Intermediate power signal, as used herein, includes the output of the input circuit, and can be a rectified signal, a regulated signal such as the output of a boost or buck converter, or an unregulated dc bus. Output circuit, as used herein, includes the circuitry that provides the welding type signal, and can include inverters, converters, transformers, rectifiers, filters, chokes, etc. Controller, as used herein, is the digital and/or analog circuitry and/or logic/instructions that cooperate to provide control signals to one or more circuits. A controller can be located on a single board, or distributed across multiple locations.

The preferred embodiment has a clamp circuit for the output inverter, and a clamp circuit for the output rectifiers. The clamp circuit for the output inverter includes a buck converter which takes the energy from clamping and gradually recycles the excess energy back into the output circuit (to the input of the output inverter) and maintains a controlled stable clamp voltage. The buck circuit also clamps the output rectifier diodes and assisting in arc striking and stabilizing by applying the high clamp voltage to the output to counter the high arc voltage transient that are encountered. In other word, the output of the clamp circuit for the output diodes is fed back to the output inverter clamp to act as a voltage source. Also, the 300 volt source can be used to quickly charge the output inductor.

Clamp circuit, as used herein, refers to a circuit used to clamp the voltage across circuitry to protect that circuitry, such as clamping the voltage across a diode. Clamp circuit output, as used herein, refers to the energy that is clamped being provided to other circuitry.

FIG. 1 is a diagram of a welding-type system 100 in accordance with the preferred embodiment. Welding-type system 100 includes an input circuit or preregulator 102, an output circuit 104 and a controller 106. These modules are preferably designed as shown in U.S. Pat. No. 6,987,242, except as set forth herein.

Preregulator 102 is preferably a boost preregulator, but other topologies such as buck, cuk, etc. may be used. Preregulator 102 preferably provides a 940V regulated dc bus across a capacitor 103 to inverter 104. Other embodiments provide for an unregulated bus, or for additional stages as part of input circuit 102, between input circuit 102 and output circuit 104, or before or as part of output circuit 104.

Figure 5:
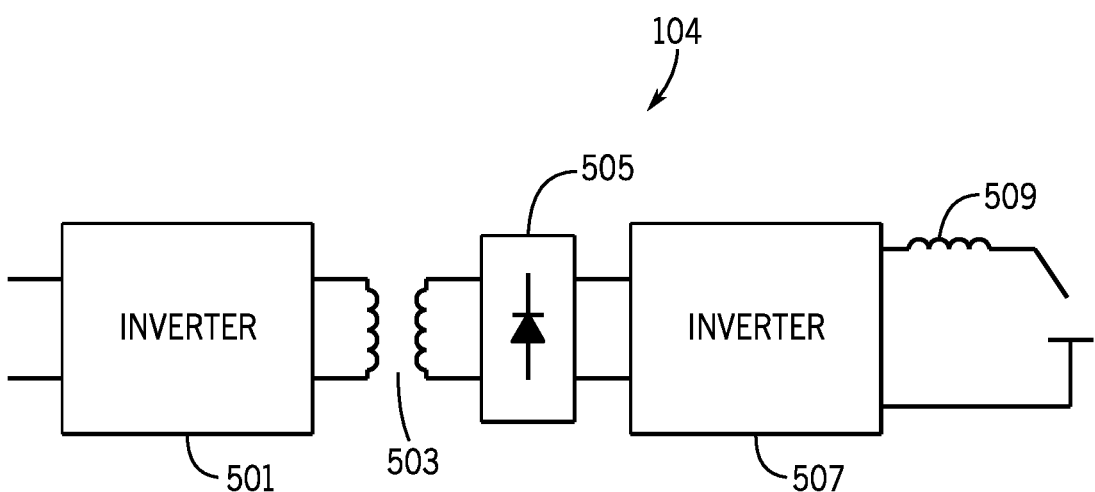
FIG. 5 is a diagram of an output circuit.

Output circuit 104, shown in more detail in FIG. 5, preferably includes a full bridge inverter 501, a transformer 503, an output rectifier 504, a full bridge output inverter 507 and an output inductor 509. Inverters 501 and 507 each include at least four inverter switches. Inverter 501 receives the dc, bus and inverts it to a desired signal using PWM at a frequency of about 20 KHz-40 KHz. The frequency is preferably high enough to keep transformer 503 small. The load is a primary of transformer 503, and the secondary of transformer 503 is rectified to be a welding type output. Output inverter 507 inverts the welding type output to provide an ac welding output. If dc welding is provided output inverter 507 can be turned off (or omitted for only dc welding power supplies). Output inverter 507 preferably operates a welding process frequency of about 20-400 Hz. Alternatives provide that on or both of inverters 501 and 504 be half bridges, or that other topologies are used. A half bridge inverter includes at least two inverter switches. Inverter switch, as used herein, refers to a switch used to invert a signal. A single inverter switch maybe comprised of several parallel devices that function as a single switch.

Controller 106 may be discrete components or an integrated circuit, and it may be analog or may include a combination of analog and digital control elements, Controller 106 receives the necessary feedback from preregulator 102 and output circuit 104 to control the switches in those circuits such that the desired dc bus and the desired welding type output are provided.

Figure 2:
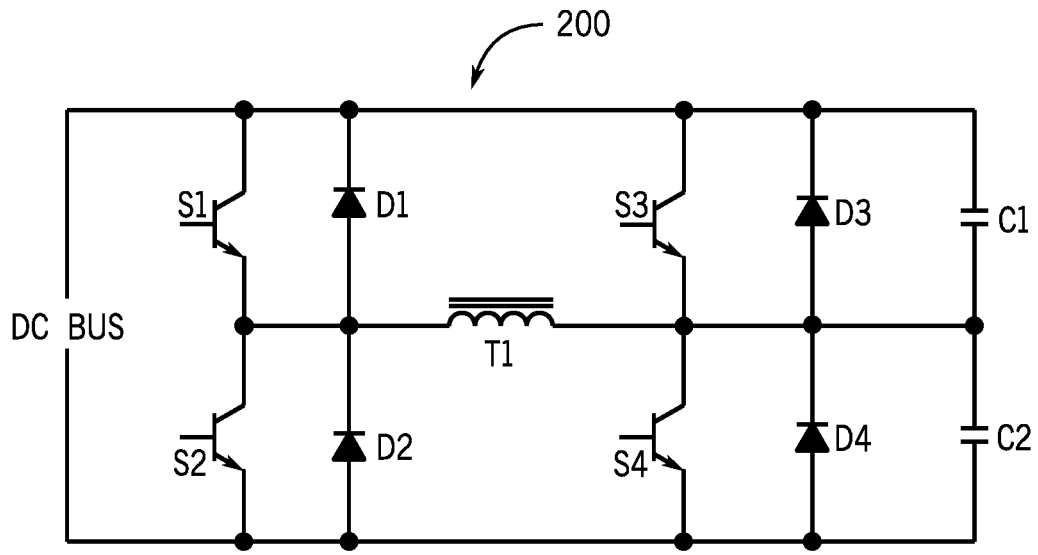
FIG. 2 is a full bridge inverter circuit used as an intermediate inverter.

FIG. 2 shows a typical full bridge inverter circuit with four inverter switches S1-S4, and four diodes D1-D4, and capacitors C1 and C2. The load is the primary of transformer T1. The secondary of transformer T1 is rectified and provided as the welding-type output.

Figure 3:
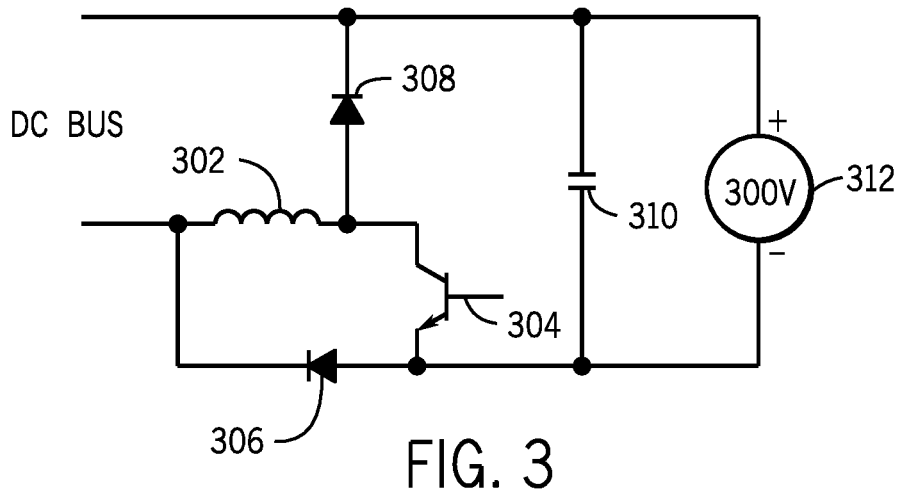
FIG. 3 is a clamp circuit for an inverter.

Output circuit 104 also includes a clamp circuit as part of inverter 507 to limit the voltage across inverter 507. A clamp circuit 300 is shown in FIG. 3 and includes a buck inductor 302, a buck switch 304, diodes 306 and 308, capacitor 310 and voltage source 312. The output of clamp circuit 300 is provided to the input of inverter 507 (the output of rectifier 505). Thus, the energy from clamping is recovered and used in the welding output. As described below, the 300 volt source can be recovered from clamping output diodes, it can be a separate source, or a combination of independent voltage and recovered voltage.

The buck converter is also used to assist in arc striking and stabilizing. The weld control can override the regular buck converter control (returning energy to the weld) and have it apply the higher clamp voltage to the input of the inverter or the rectified dc link. This allows a high driving voltage to be applied to the output when needed. Limiting the voltage across the inverter, as used herein, refers to clamping the voltage across the diodes in an inverter bridge. Voltage across the inverter, as used herein, refers to the voltage across the diodes in an inverter bridge Buck switch 304 is controlled to provide three advantages in the preferred embodiment. Current (from the output rectifier clamp) is recycled back to the input of output inverter 507 in a gradual continuous fashion (i.e., over a plurality of switching cycles), and thus the clamped energy is provided back into the weld output in a gradual fashion, and it keeps the clamped voltage under control. Also, buck switch 304 is controlled to aid in reversing the current during commutation of the switches in output inverter 507 by providing a high voltage to the output circuit to counter the transient high arc voltage and keep the current in the output inductor rising. Also, buck switch 304 is controlled to provide a high voltage to counter the high initial arc voltage and help the current start to rise at the initiation of the weld. The 300 volt source can be used to commutate at low current output (when there is neither a need to clamp not sufficient energy from clamping to commutate). Buck switch 304 is controlled by controller 106, which receives feedback signals indicating bus, clamp and inverter voltages. 300 volt source 312 is also used in the preferred embodiment to charge output inductor 509 rather than crowbarring the bus.

Figure 4:
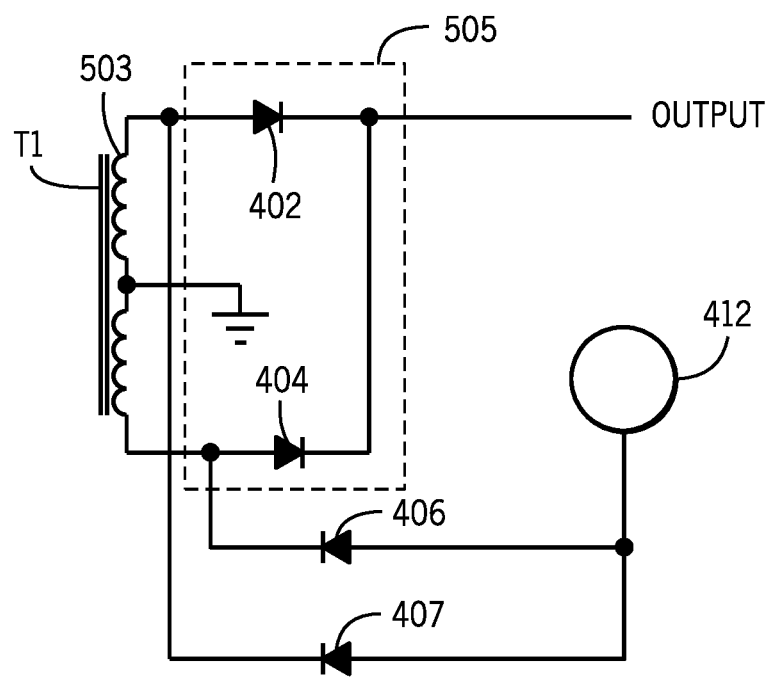
FIG. 4 is a clamp circuit for an inverter.
Figure 6:
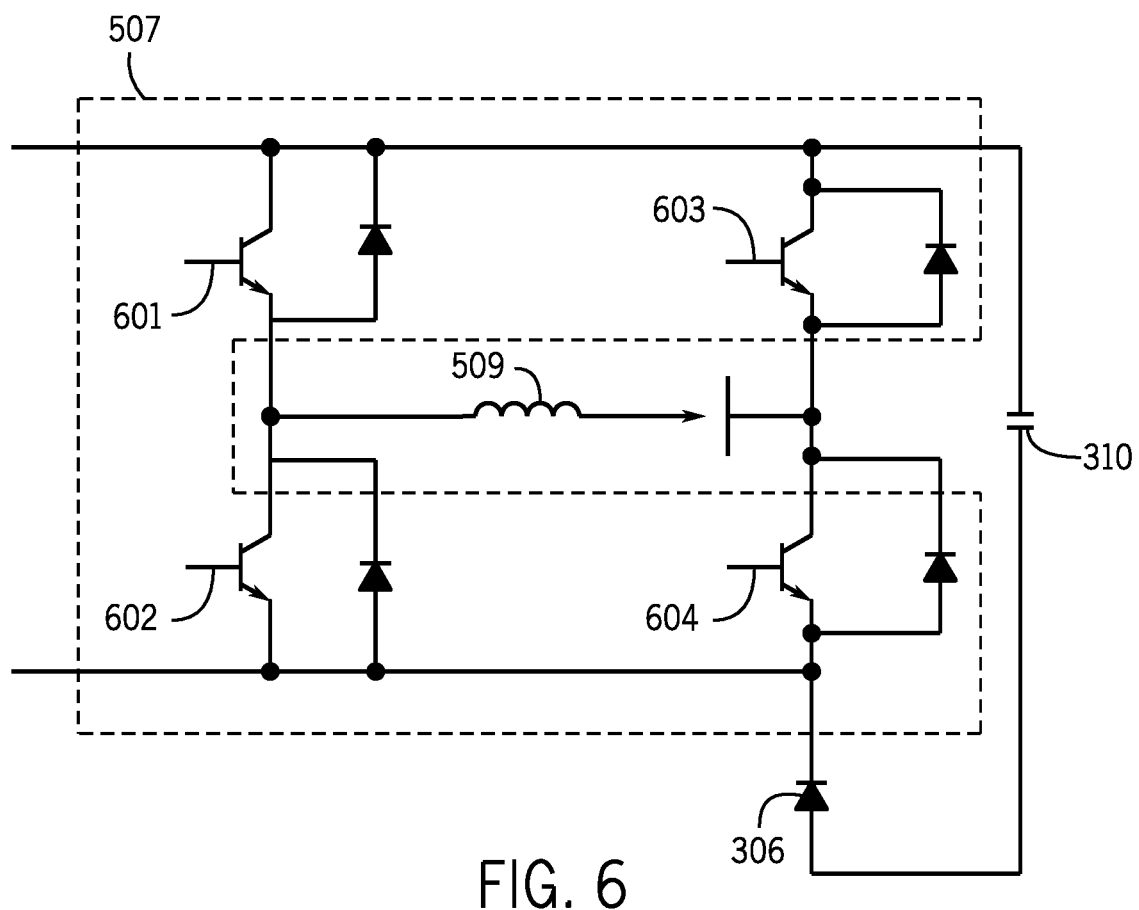
FIG. 6 is a full bridge inverter circuit used as an output inverter.

Output circuit 104 includes the secondary of primary 503, rectifier 505, including diodes 402 and 404, as shown in FIG. 4. A diode 406 clamps diodes 402 and 404, and that clamp is provided as a voltage source 412. This voltage can override the 300 volt source, or the 300 volt source can be derived from source 412. FIG. 6 shows output inverter 507 in more detail, which includes switches 601-604. Capacitor 310, diode 306 and output inductor 509 are also shown.

Alternatives include clamping only output inverter 507 or only output diodes 402 and 404, not providing the 300V source, as well as not using the clamped voltage to commutate inverter 507, or not using the 300V source to charge output inductor 509.

Numerous modifications may be made to the present disclosure which still fall within the intended scope hereof.

Thus, it should be apparent that there has been provided a method and apparatus for providing welding type power that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding type power supply comprising:
   an input circuit disposed to receive an input power signal and to provide an intermediate power signal;
   an output circuit disposed to receive the intermediate power signal and to provide a welding type power output, wherein the output circuit includes an inverter having at least two inverter switches, and wherein the output circuit includes an output inductor through which the welding type power is provided, wherein the inverter includes a clamp circuit having a voltage source distinct from the intermediate power circuit, and wherein the clamp circuit is connected such that the voltage source is able to charge the output inductor at the initiation of a welding arc, wherein the output circuit further includes an intermediate inverter, a transformer and a rectifier, wherein the intermediate inverter is disposed to receive the intermediate power signal and disposed to provide an intermediate ac signal to the transformer, and wherein the transformer is disposed to provide a transformed ac signal to the rectifier, and wherein the rectifier is disposed to provide a rectified signal to the inverter, and wherein the rectifier includes at least two diodes, and wherein a second clamp circuit limits the voltage across the at least two diodes, and wherein the clamp circuit provides an output across the voltage source; and
   a controller having control outputs connected to the input circuit and the output circuit.

2. The welding type power supply of claim 1, wherein the clamp circuit limits the voltage across the inverter, and wherein the clamp circuit includes a buck circuit connected to the voltage source.

3. The welding type power supply of claim 1, wherein the input circuit includes a boost circuit, and the intermediate power signal is a boosted dc bus.

4. A welding type power supply comprising:
   an input circuit disposed to receive an input power signal and to provide an intermediate power signal;
   an output circuit disposed to receive the intermediate power signal and to provide a welding type power output, wherein the output circuit includes an inverter having at least two inverter switches, and wherein the output circuit includes an output inductor through which the welding type power is provided, wherein the inverter includes a clamp circuit having a voltage source, and wherein the clamp circuit is connected to charge the output inductor; and
   a controller having control outputs connected to the input circuit and the output circuit;
   wherein the output circuit further includes an intermediate inverter, a transformer and a rectifier, wherein the intermediate inverter is disposed to receive the intermediate power signal and disposed to provide an intermediate ac signal to the transformer, and wherein the transformer is disposed to provide a transformed ac signal to the rectifier, and wherein the rectifier is disposed to provide a rectified signal to the inverter, and wherein the rectifier includes at least two diodes, and wherein a second clamp circuit limits the voltage across the at least two diodes, and wherein the clamp circuit provides an output across the voltage source.

5. The welding type power supply of claim 4, wherein the input circuit includes a boost circuit, and the intermediate power signal is a boosted dc bus.

\* \* \* \* \*